United States Patent [19]

Zamora-McKelvy et al.

[11] Patent Number: 5,991,770
[45] Date of Patent: Nov. 23, 1999

[54] METHOD FOR AUTOMATICALLY GENERATING INTERNET READY GIFS FROM SELECTED DATA FILES

[75] Inventors: Michele Zamora-McKelvy, Parker; Marlon D. Buggs, Denver; Bryan Stroble, Aurora, all of Colo.; Daniel Pride, Polson, Mont.

[73] Assignees: U S West, Inc, Denver; MediaOne Group, Englewood, both of Colo.

[21] Appl. No.: 09/000,827

[22] Filed: Dec. 30, 1997

[51] Int. Cl.$^6$ .................................................. G06F 17/30
[52] U.S. Cl. .......................... 707/200; 707/523; 707/530; 707/500
[58] Field of Search .................................. 707/500, 523, 707/530, 3, 200

[56] References Cited

U.S. PATENT DOCUMENTS 5,848,415 12/1998 Guck ........................................ 707/10

OTHER PUBLICATIONS

MSDN Library ("Web Projects", "Check Hyperlinks on a Web Project", "Create a Site Map", and "Deploy Web Files to a Server", http://msdn.microsoft.com/isapi/msdnlib.idc?theURL=/library/techart/vssauto.htm), Aug. 10, 1999.

MSDN Library ("How Visual SourceSafe Tracks Files" and "VSSFlags", http://msdn.microsoft.com/isapi/msdnlib.idc?theURL=/library/techart/vssauto.htm), Aug. 10, 1999.

Microsoft Press Release, "One–Year Anniversary of Windows 95 to be Celebrated", http://www.microsoft.com/PressPass/press/1996/aug96/wn95yrpr.htm, p. 1, Aug. 21, 1996.

Screen Capture Print Outs, pp. 1–9, Apr. 16, 1999.

Primary Examiner—Thomas G. Black
Assistant Examiner—William Trinh
Attorney, Agent, or Firm—Brooks & Kushman

[57] ABSTRACT

A method and system are provided for automatically generating Internet formatted data files from nonInternet formatted data files. The present invention includes processing one or more directories selected by a user to locate and tag any files of a type to be converted. A file list is created and output as a spreadsheet type text file containing the file information for each file to be processed. Each located file is then converted into an Internet ready file format, and transferred to a chosen destination. The present invention allows for automatic generation of an Internet yellow page directory using nonInternet formatted customer advertising data files with significantly reduced production costs and likelihood of processing error.

14 Claims, 1 Drawing Sheet

METHOD FOR AUTOMATICALLY GENERATING INTERNET READY GIFS FROM SELECTED DATA FILES

TECHNICAL FIELD

The present invention relates to methods and systems for rendering graphics type data files accessible for distribution via an Internet connection.

BACKGROUND ART

With the increasing use of the Internet for conducting commercial transactions, a corresponding need has arisen for Internet servers to increase the ease and efficiency of repurposing traditional printed documents and products into a form suitable for distribution via a web browser. While file conversion arrangements have been developed for converting noninternet ready files into a suitable Internet ready format, such as a JPEG or GIF file, such arrangements require extensive human input and oversight to control the repurposing operation, and then to subsequently process the converted files to make them available for distribution in a web page.

However, the need for extensive human input and control makes the repurposing and web page construction process highly susceptible to human error. In addition, such human interaction significantly increases administrative burdens and server production costs while simultaneously decreasing server throughput efficiency.

DISCLOSURE OF THE INVENTION

It is therefore an object of the present invention to provide a method and system for converting and processing files into an Internet ready form which significantly reduces the amount of human interaction during production.

It is another object of the present invention to provide a method and system for automatic conversion and generating of nonInternet files into an Internet ready format.

It is a further object of the present invention to provide a method and system for converting and processing files into an Internet ready form which significantly reduces production cost.

It is yet another object of the present invention to provide a method and system for producing an Internet yellow page directory by automatically converting selected nonInternet advertising data files into a Internet ready GIFs.

In accordance with these and other objects, the present invention provides a method for generating Internet formatted data files from a predetermined type of nonInternet formatted data files stored in a plurality of file directories of a microprocessor based computer system. The method involves selecting at least one file directory for processing, finding all data files located in the selected directory, and analyzing all found data files to determine a file type. All files of the predetermined type are them tagged. A text file is then generated containing predetermined file property information for each tagged filed found in the selected directory. The tagged files are then automatically converted into a file format suitable for distribution over the Internet, and transferred to a selected destination.

In accordance with another aspect of the present invention, a system for generating Internet formatted data files from a predetermined type of nonInternet formatted data files stored in a plurality of file directories of a microprocessor based computer system includes a volume analyzer which is arranged to receive inputs selecting at least one file directory for processing, analyze all data files found in the selected directory to determine a file type, and tag all files of the predetermined type. A text file generator processes the tagged files to produce a text file containing predetermined file property information for each tagged file. A file format convertor automatically converts the tagged files into a file format suitable for distribution over the Internet. Finally, a file retriever is arranged to transfer the converted files to a selected destination.

In accordance with yet another aspect of the present invention, a method is provided for producing an Internet yellow page directory from selected nonInternet ready advertising data files stored in a plurality of file directories of a microprocessor based computer system. The method includes selecting at least one file directory for processing, finding all advertising data files located in the selected directory, and tagging all found advertising data files. A spreadsheet text file is then generated containing predetermined file property information for each tagged file. The tagged files are then automatically converted into a file format suitable for distribution over the Internet, and transferred to a destination for incorporation into the yellow page directory.

In accordance with other aspects of the present invention, the text file is generated in the form of a spreadsheet file so as to facilitate easy editing of the file property information.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
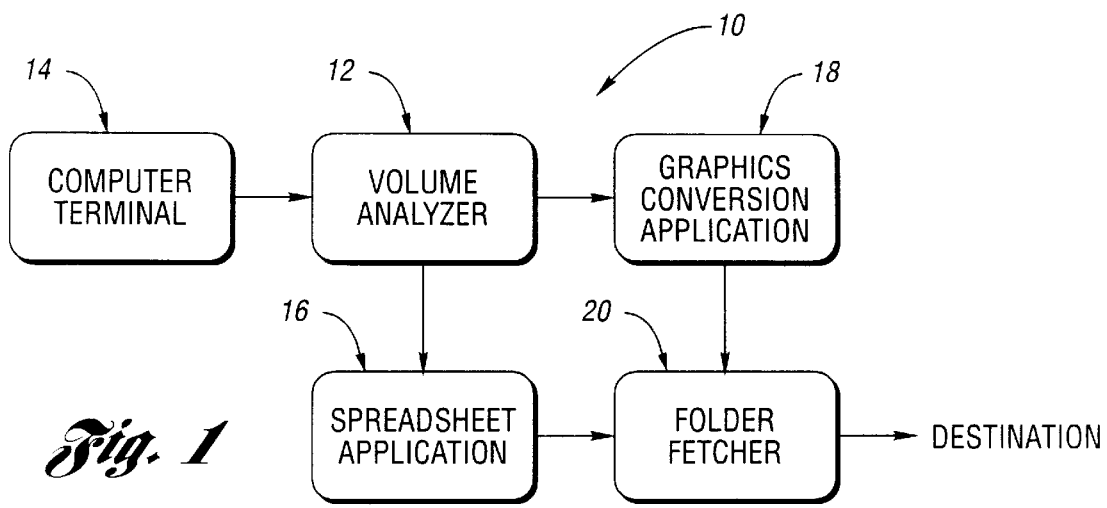
FIG. 1 is a block diagram of a system for automatically converting selected nonInternet ready data files into Internet ready GIF files in accordance with the present invention.

Referring to FIG. 1, a system 10 for automatically converting selected nonInternet ready graphics type data files into Internet ready GIF files is shown in accordance with the present invention.

The present invention is implemented using a microprocessor based computer and server station, and the process can be realized using any suitable programming code known to one of ordinary skill in the art. In the preferred embodiment, the process is implemented using Applescript as the programming language, and is arranged to locate and process file directories/folders and graphics files stored therein on a single high-end Apple® Macintosh® computer terminal.

As shown, a volume analyzer 12 is arranged to receive selections from a user which designate the directories/folders to be processed. The selections are input via a computer terminal 14. Volume analyzer 12 is arranged to locate the designated directories, and automatically analyze any files stored therein to find and identify particular data files of interest, such as graphics data files to be used in published advertisements. Each file analyzed is tagged such as with a color coding arrangement so as to distinguish between files to be processed, and files not of interest.

Volume analyzer 12 then generates a listing of all located files to be processed. In the preferred embodiment, the listing of files is created and output as a text file via a spreadsheet type application 16. The list identifies such items of file information as volume name, directory/folder name, file name, company name and account information, UDAC, file size, directory size, last date of modification, file age, and directory code. The use of a spreadsheet text file allows easy editing of file information.

After spreadsheet editing is complete, all files in the listing are supplied to a graphics processing application 18 for repurposing of the data into Internet ready GIF files or documents. In the preferred embodiment, graphics processing application 18 is formed by launching the software packages MRGraphics and FreeHand 7.0.2.

After repurposing of the data files is complete, a user can then select one or more spreadsheet lists to effect transfer of the files listed thereon to a particular destination. More specifically, a folder fetcher application 20 is responsive to the user's inputs to Locate and retrieve the repurposed files listed on the designated spreadsheet list(s). The retrieved files are then copied to the destination specified by the user.

In accordance with one embodiment, the Internet ready GIF files can be transferred to a predetermined location or database either automatically at the end of GIF conversion, or through simple user prompts, to facilitate incorporation into an Internet yellow page directory. Thus, the need for human interaction and the attendant cost and potential for error is significantly reduced.

Figure 2:
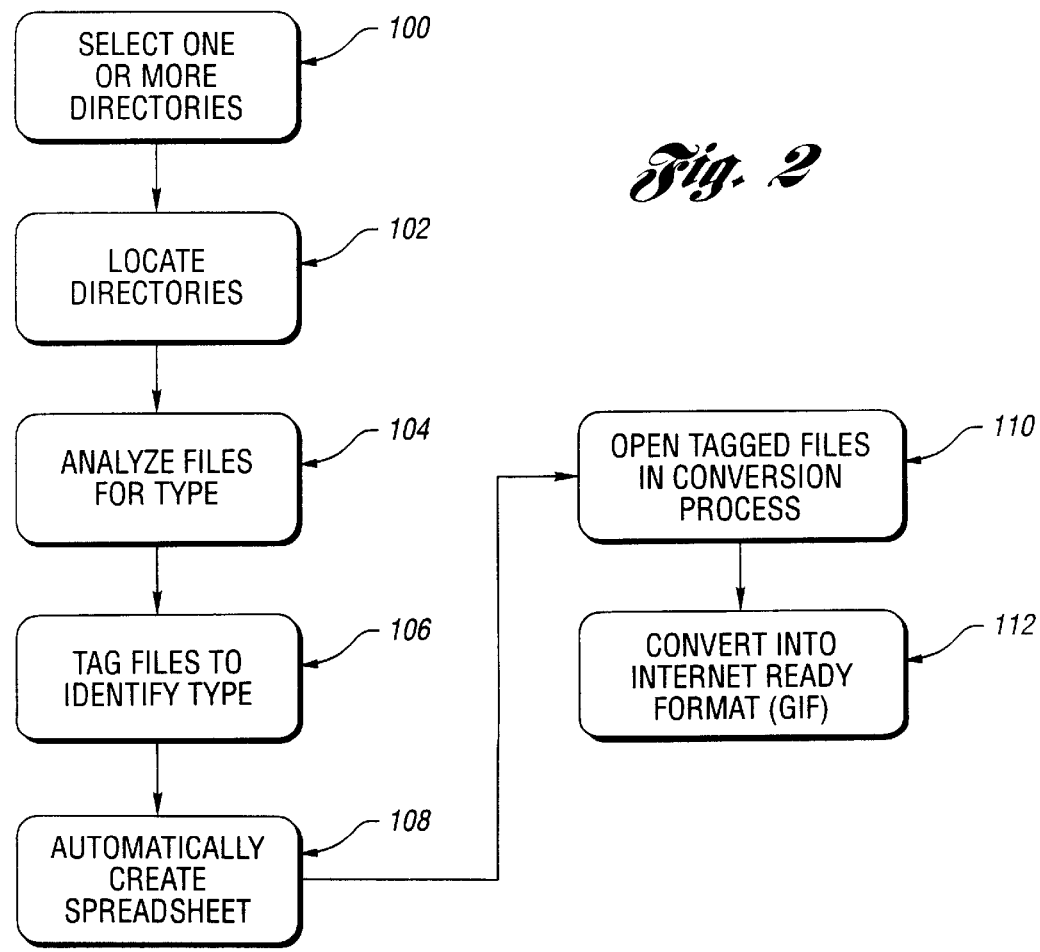
FIG. 2 is a flow chart Illustrating the overall automatic conversion process in accordance with the present invention.

Referring now to FIG. 2, a flow chart summarizes the overall process of the present invention. At block 100, one or more directories/folders to be processed are selected by a user. At block 102, the designated directories are located, and any files stored therein are automatically analyzed at block 104 to find and identify the type of files which are to be processed. Each file is tagged at block 106 to distinguish between files to be processed, and files not of interest.

At block 108, a file list is created and output as a spreadsheet type text file containing the file information for each file to be processed, i.e., volume name, directory/folder name, file name, company name and account information, UDAC, Eile size, directory size, last date of modification, file age, and directory code.

Each located file of interest is then opened at block 110 in the graphics processing application. At block 112, each file is converted into an Internet ready GIF file saved without any borders, markers, or miscellaneous text. During the conversion process, all text found in a file is preferably saved within the file to facilitate later separation of files which can also be used to build text based web pages.

When the conversion process, is done, the selected folder will contain the following three elements: (1) a folder containing all files in GIF format, ready to be distributed on the Internet such by being published in an Internet yellow page directory; (2) a folder containing text files with all the text ready to be pulled into text based web pages; and (3) a text file containing a spreadsheet which lists all the information about each processed data file.

While the best mode for carrying out the invention has been described in detail, those familiar with the art to which this invention relates will recognize various alternative designs and embodiments for practicing the invention as defined by the following claims.

What is claimed is:

1. A method for automatically repurposing a predetermined type of nonInternet formatted data files stored in a plurality of file directories of a microprocessor based computer system into Internet formatted data files, said method comprising:

selecting at least one file directory for processing;

finding all data files located in the selected directory;

analyzing all found data files to determine a file type and automatically tagging all files of the predetermined type;

generating a text file comprising predetermined file property information for each tagged file found in the selected directory;

automatically converting the tagged files into a file format suitable for distribution over the Internet; and transferring the converted files to a selected destination.

2. The method of claim 1 wherein the generated text file comprises a spreadsheet type file, said method further comprising receiving editing inputs for the file property information in the spreadsheet before converting the tagged files.

3. The method of claim 1 wherein said files found in the selected directory are analyzed to find and tag graphics-type data files.

4. The method of claim 3 wherein said graphics-type data files comprise customer advertising data files.

5. The method of claim 4 further comprising generating a web page using the transferred customer advertising data files.

6. The method of claim 1 wherein tagging the files comprises color coding the files according to file type.

7. The method of claim 5 the conversion step further comprises:

detecting the presence of text in a processed advertising file;

automatically separating the text from the advertising file; and storing the separated text in a format ready for distribution in a text based web page.

8. A system for automatically repurposing a predetermined type of nonInternet formatted data files stored in a plurality of file directories of a microprocessor based computer system into Internet formatted data files, said system comprising:

a volume analyzer arranged to receive inputs selecting at least one file directory for processing, analyze all data files found in the selected directory to determine a file type, and automatically tag all files of the predetermined type;

a text file generator for processing the tagged files to produce a text file comprising predetermined file property information for each tagged file;

a file format convertor arranged to automatically convert the tagged files into a file format suitable for distribution over the Internet; and a file retriever arranged to transfer the converted files to a selected destination.

9. The system of claim 8 wherein said text file comprises a spreadsheet file.

10. The system of claim 9 wherein said text file generator comprises a text editor for allowing editing of the file property information prior to file conversion.

11. The system of claim 8 wherein said predetermined type of files comprise graphics-type data files.

12. The system of claim 11 wherein said graphics-type data files comprise customer advertising data files.

13. The system of claim 12 wherein said selected destination comprises a web page generator.

14. A method for producing an Internet yellow page directory from selected nonInternet ready advertising data files stored in a plurality of file directories of a microprocessor based computer system, said method comprising:

selecting at least one file directory for processing;

finding all advertising data files located in the selected directory;

automatically tagging all found advertising data files;

generating a spreadsheet text file comprising predetermined file property information for each tagged file;

automatically converting the tagged files into a file format suitable for distribution over the Internet; and transferring the converted files to a destination for incorporation into the yellow page directory.

\* \* \* \* \*